United States Patent [19]

Wagensonner

[11] 4,100,590
[45] Jul. 11, 1978

[54] SCENE-BRIGHTNESS-DEPENDENT CONTROL OF FLASHBULB FLASH DURATION

[75] Inventor: Eduard Wagensonner, Aschheim, Fed. Rep. of Germany

[73] Assignee: AGFA-Gevaert AG, Leverkusen, Fed. Rep. of Germany

[21] Appl. No.: 734,988

[22] Filed: Oct. 22, 1976

[30] Foreign Application Priority Data

Nov. 6, 1975 [DE] Fed. Rep. of Germany ... 7535234[U]

[51] Int. Cl.² ............................................. G03B 15/02
[52] U.S. Cl. ......................................... 362/16; 362/4; 362/5
[58] Field of Search ................... 240/1.3, 20; 354/227, 354/126, 132; 350/160 LC; 362/4, 5, 16, 3, 19

[56] References Cited

U.S. PATENT DOCUMENTS

| 3,456,101 | 7/1969 | Rentschler et al. | 240/1.3 |
| 3,517,196 | 6/1970 | Owens | 240/1.3 |
| 3,597,044 | 8/1971 | Castellano | 350/160 LC |
| 3,783,260 | 1/1974 | Broadt et al. | 240/1.3 |

*Primary Examiner*—J D Miller
*Assistant Examiner*—Peter S. Wong
*Attorney, Agent, or Firm*—Michael J. Striker

[57] ABSTRACT

An apparatus is described for effecting scene-brightness-dependent control of the duration of the flash produced by a flashbulb flash unit having at least one flashbulb. The apparatus includes a housing so configured and dimensioned that it can be pushed over and onto the flashbulb flash unit. The housing is provided with at least one controllable-transparency optical unit located to occupy the position in front of the flashbulb of the flash unit when the housing has been pushed into place over the flash unit. The housing furthermore contains an automatic scene-brightness-dependent flash-duration control circuit connected to the optical unit and operative for controlling the duration of the flash produced by the flashbulb by keeping the optical unit transparent for a scene-brightness-dependent exposure interval and then automatically rendering the optical unit non-transparent.

9 Claims, 3 Drawing Figures

4,100,590

SCENE-BRIGHTNESS-DEPENDENT CONTROL OF FLASHBULB FLASH DURATION

BACKGROUND OF THE INVENTION

The invention relates to the problem of providing scene-brightness-dependent control of flash duration when the flash unit being employed is of the flashbulb type.

It is known to effect scene-brightness-dependent control of flash duration when the flash unit is of the type employing an electronic flash lamp. This is conventionally effected by utilizing an automatic scene-brightness-dependent flash-duration control circuit. The control circuit includes a light sensor positioned to receive scene light, a light-measuring circuit operative for generating a signal indicative of the total of received scene light, and a threshold circuit operative for detecting when the total of received scene light has reached a predetermined value and in response to such detection terminating the flash being produced by the electronic flash lamp.

More particularly, the present invention relates to the problem of providing such flash-duration control means for the control flashbulb flash units.

SUMMARY OF THE INVENTION

It is a particular object of the invention to provide an apparatus capable of effecting scene-brightness-dependent control of the duration of the flash produced by a flashbulb flash unit, the apparatus being so designed as to be extremely simple in construction and very readily manipulated by the user of the apparatus.

This object and others which will become more understandable from the description, below, of preferred embodiments, can be met, according to one advantageous concept of the invention, by utilizing a controllable-transparency optical unit, such as a controllable-transparency ceramic optical unit. The controllable-transparency optical unit forms part of the housing of the control apparatus. The housing is so configured and dimensioned that it can be pushed over and onto the flashbulb flash unit. When the housing is thusly pushed into place on the flash unit, the controllable-transparency optical unit occupies a position in front of the flashbulb of the flash unit. The housing furthermore contains a battery, a light sensor positioned to receive scene light, a light-measuring circuit operative for determining total scene light, and a threshold circuit connected to the optical unit and operative for rednering the latter non-transparent when the total of scene light has reached a predetermined value during the course of the flash produced by the flashbulb of the flash unit.

When the flash unit is in readiness for operation, the flashbulb is fired. The light radiating therefrom passes through the transparent controllable-transparency optical unit and travels to the subject to be photographed. The light reflected back from the subject reaches the light sensor. The light-measuring circuit, after the elapse of a time interval dependent upon the brightness of the thusly reflected light, generates a signal whose value indicates a predetermined total of scene light. This value is detected by a threshold detector, which in response to such detection causes the controllable-transparency optical unit to undergo a transition into its non-transparent state. Accordingly, the duration of the flash produced by the flashbulb is automatically limited in dependence upon the light energy radiated out from the fired flashbulb and in dependence upon the distance between the flashbulb and the subject to be photographed.

According to a further concept of the invention, when the flashbulb flash unit is of the type provided with a plurality of flashbulbs, the control apparatus of the present invention is provided with a plurality of controllable-transparency optical units disposed in a window-like arrangement on the front wall of the housing of the apparatus, arranged in correspondence to the arrangement of the flashbulbs and equal in number thereto.

According to another concept of the invention, each controllable-transparency optical unit is provided on both its front and its back side with a polarization filter.

According to yet another concept of the invention, the electrical conductors leading from the control circuit to the one or more controllable-transparency optical units extend within the front wall of the housing of the control apparatus.

According to a further concept of the invention, there is arranged in front of the light sensor a light-blocking element, for example a gray wedge filter, mounted shiftably relative to the light sensor for varying the fraction of the scene light actually incident upon the light sensor. An activating member coupled to the light-blocking element and manipulated from the exterior of the housing of the apparatus is provided with a calibrated scale for use in setting the position of the activating member and accordingly of the light-blocking element, for example in correspondence to the diaphragm setting of the camera with which the flash unit and control apparatus therefor are being used. Advantageously, the control circuit is provided with additional adjusting means for adjusting the operation of the control circuit to take into account the sensitivity of the film being employed.

Thus, all the means in question can be provided in a single housing which is very readily pushed into operative position on the flashbulb flash unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
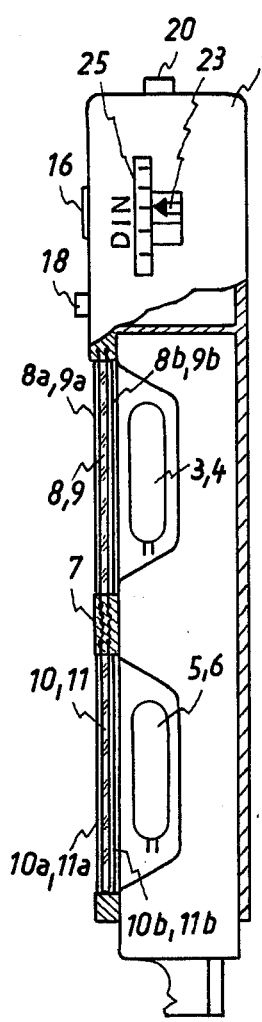
FIGS. 1 and 2 depict a first embodiment of the invention.
Figure 1:
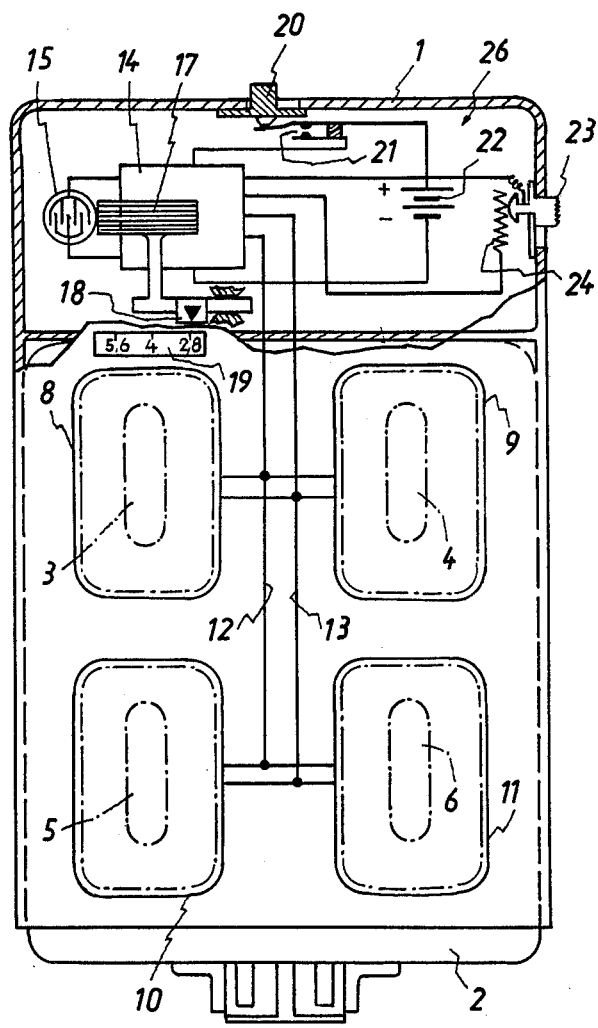

In FIGS. 1 and 2, numeral 1 denotes a one-piece housing configured and dimensioned so that it can be pushed into place over a flashbulb flash unit 2. The housing 1 is shown pushed into place, in FIGS. 1 and 2. The flashbulb flash unit 2 is provided with four flashbulbs 3, 4, 5, 6. The front side 7 of the housing 1 is provided with four windows 8, 9, 10, 11 made of controllable-transparency ferroelectric ceramic material. Each of the controllable-transparency optical units 8, 9, 10, 11 is provided on its front and on its back side with respective polarization filters 8a, 8b; 9a, 9b; 10a, 10b; 11a, 11b. These optical units are transparent when voltate is not being applied to them and become non-transparent in response to the application of such voltage.

In per se conventional manner, the application of voltage to the optical units 8, 9, 10, 11 can be either longitudinal (the voltage being applied to transparent electrodes located at opposite faces of the optical units) or transverse (the voltage being applied to interdigitated transparent comb-electrodes provided on only one of the two faces of the optical units).

The transparent electrodes of the optical units 8, 9, 10, 11 have connected to them electrical conductors 12 and 13. These conductors extend within the front side 7 of the housing of the control apparatus. The conductors 12, 13 lead to a scene-brightness-dependent flash-duration control circuit comprised of a fast-responding light sensor 15 positioned behind a light window 16 and circuitry 14 including a light-measuring circuit for totalizing received light and a threshold circuit for determining when the total of scene light has reached a predetermined value and in response thereto applying a voltage to the optical units 8, 9, 10, 11. The flash-duration control circuit, per se, can be of any of the conventional types ordinarily used for the control of the duration of the flash produced by flash units of the type employing electronic flash lamps.

Arranged in front of the light sensor 15 is a light-blocking element 17, for example a gray wedge filter. The light-blocking element 17 is mounted shiftable relative to the light sensor 15 for varying the fraction of scene light actually received by the sensor. The light-blocking element 17 is coupled to an activating member 18 manipulatable from the exterior of the housing 1. Activating member 18 is provided with a calibrated diaphragm-opening scale 19 for use in setting the position of the light-blocking element 17 in correspondence to the setting of the diaphragm of the camera with which the flashbulb flash unit 2 is being employed.

The housing 1 of the flash-duration control apparatus furthermore includes a battery 22 for energizing the automatic timing circuitry. The battery 22 can be connected to and disconnected from such circuitry by means of a switch 21 activatable via a slider 20 which can be manipulated from the exterior of the housing 1. Forming part of the timing circuitry is a variable resistor 24 whose wiper is adjustable from the exterior of the housing 1 utilizing an activating member 23. Member 23 is provided with a calibrated film-sensitivity scale 25 for use in setting the resistor 24 to a value corresponding to the sensitivity of the film being employed.

The electrical components described above are located in a housing chamber 26 which is separated off from the chamber of housing 1 actually accommodating the flash unit 2.

The timing circuitry can be synchronized to camera operation or not. If synchronized, any means conventional in the art for that purpose can be used, i.e., so that the start of the light-measuring operation is coincident with the start of the exposure and/or with the start of the flash produced by the flashbulb. Such synchronization is well known in the context of timing circuits for flash units of the electronic flash lamp type.

Figure 3:
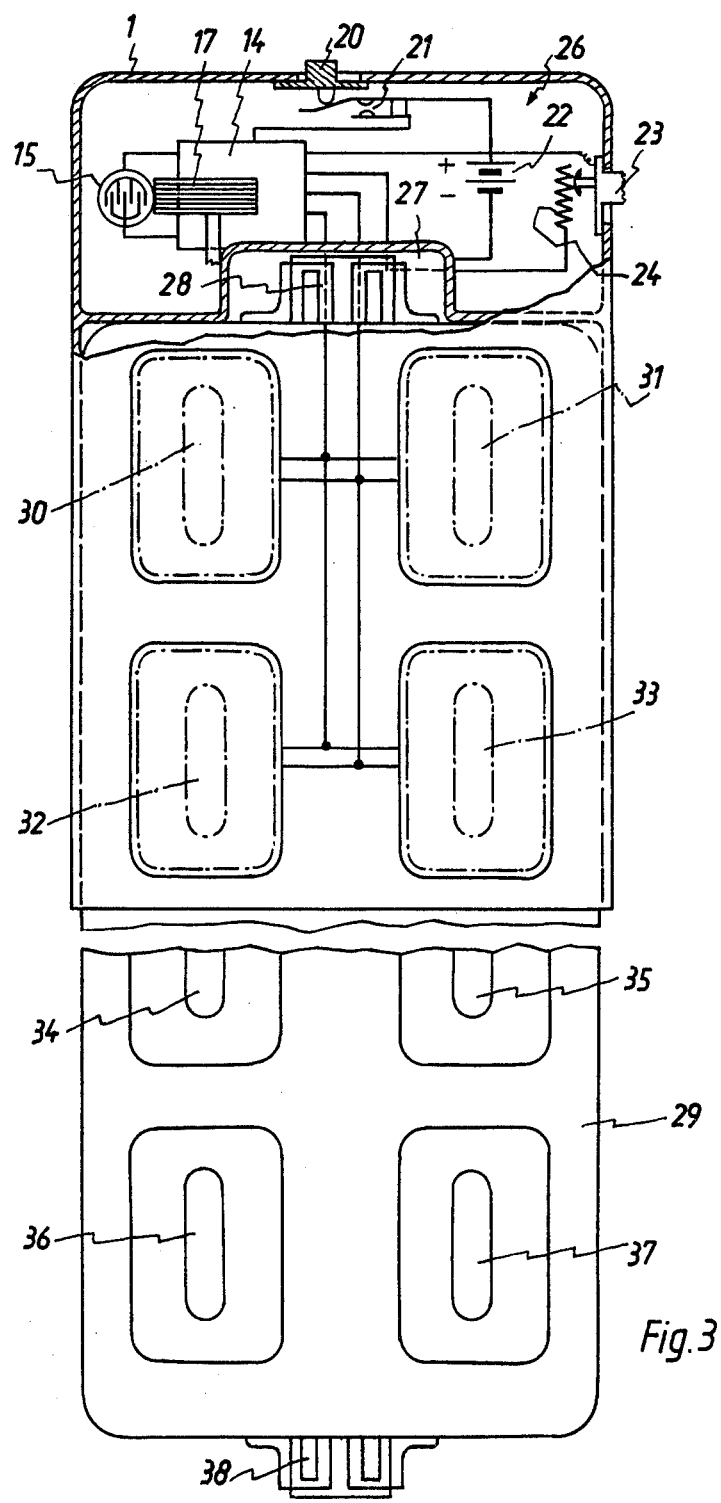
FIG. 3 depicts a second embodiment of the invention.

The embodiment depicted in FIG. 3 differs from that of FIGS. 1 and 2 in that the housing chamber 26 is provided with a mechanical receptacle 27 for a plug-and-socket connector 28 of a flash unit 29 of the type provided with eight flashbulbs, four on its front side and four on its back side. After the four flashbulbs 30, 31, 32, 33 have been fired, the flash unit 29 is removed from the housing 1 of the flash-duration control apparatus and turned around so that now its not yet fired flashbulbs 34, 35, 36, 37 will face front and then flash unit 29 is reinserted into the housing 1. Upon such reinsertion the plug-and-socket connector 28 will again be received by the mechanical receptacle 27 of the housing 1. The receptacle 27 merely serves to mechanically receive the base of the plug-and-socket connector 28. Electrical connections are not made within the receptacle 27.

It will be understood that each of the elements described above, or two or more toegether, may also find a useful application in other types of circuits and constructions differing from the types described above.

While the invention has been illustrated and described as embodied in an apparatus provided with a plurality of controllable-transparency optical units disposed in correspondence to a plurality of flashbulbs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for effecting scene-brightness-dependent control of the duration of the flash produced by a flashbulb flash unit having at least one flashbulb, the arrangement comprising, in combination, a housing so configured and dimensioned that it can be pushed over and onto the flashbulb flash unit, the housing being provided with at least one controllable-transparency optical unit located to occupy the position in front of the at least one flashbulb of the flash unit when the housing has been pushed into place over the flash unit, and an automatic scene-brightness dependent flash-duration control circuit in the housing connected to the optical unit and operative for controlling the duration of the flash produced by the flashbulb by keeping the optical unit transparent for a scene-brightness-dependent exposure interval and then automatically rendering the optical unit non-transparent, the flash-duration control circuit comprising a battery in the housing, a light sensor in the housing positioned to receive scene light, a light-measuring circuit in the housing and connected to the battery and to the light sensor and operative for generating a signal indicative of total scene light, and a threshold circuit in the housing and connected to the light-measuring circuit and to the controllable-transparency optical unit and operative for rendering the latter non-transparent when the signal generated by the light-measuring circuit has reached a value corresponding to a predetermined total of scene light.

2. The arrangement defined in claim 1, wherein the at least one controllable-transparency optical unit is a controllable-transparency liquid-crystal element.

3. The arrangement defined in claim 1, wherein the at least one controllable-transparency optical unit is a controllable transparency ceramic element.

4. The arrangement defined in claim 1, the flashbulb flash unit being of the type provided with a plurality of flashbulbs, the housing being provided with a plurality of controllable-transparency optical units arranged on the housing in correspondence to the positions of the flashbulbs of the flash unit, the flash-duration control circuit being connected to all the controllable-transparency optical units for controlling the durations of the flashes produced by the plurality of flashbulbs of the flash unit by controlling the time intervals during which the respective optical units are kept transparent.

5. The arrangement defined in claim 1, each optical unit being provided on both its front and its back side with a polarization filter.

6. The arrangement defined in claim 1, the housing having a front wall, the flash-duration control circuit including conductors leading to the at least one controllable-transparency optical unit, the conductors being located within the front wall of the housing.

7. The arrangement defined in claim 1, the flash-duration control circuit furthermore including a light-blocking element mounted in front of the light sensor shiftable relative thereto for varying the fraction of scene light received by the light sensor, a manual actuator coupled to the light-blocking element and manipulatable from the exterior of the housing, and a calibrated scale on the exterior of the housing positioned to cooperate with the manual actuator for use in setting the position of the manual actuator.

8. The arrangement defined in claim 7, the flash-duration control circuit furthermore including adjusting means manipulatable from the exterior of the housing for adjusting the operation of the control circuit to take into account film sensitivity.

9. The arrangement defined in claim 1, furthermore including in combination therewith the flashbulb flash unit.

* * * * *